US012476345B2

(12) United States Patent
Huang et al.

(10) Patent No.: US 12,476,345 B2
(45) Date of Patent: Nov. 18, 2025

(54) ANTENNA ASSEMBLY

(71) Applicant: Advanced Wireless & Antenna INC., New Taipei (TW)

(72) Inventors: Ching-Hsiang Huang, New Taipei (TW); Yu-Ting Kao, New Taipei (TW)

(73) Assignee: ADVANCED WIRELESS & ANTENNA INC., New Taipei (TW)

(*) Notice: Subject to any disclaimer, the term of this patent is extended or adjusted under 35 U.S.C. 154(b) by 187 days.

(21) Appl. No.: 18/356,643

(22) Filed: Jul. 21, 2023

(65) Prior Publication Data

US 2024/0030587 A1 Jan. 25, 2024

(30) Foreign Application Priority Data

Jul. 21, 2022 (TW) ................................ 111207886
Sep. 2, 2022 (TW) ................................ 111209616

(51) Int. Cl.
*H01Q 1/22* (2006.01)
*H01Q 1/52* (2006.01)

(52) U.S. Cl.
CPC ........... *H01Q 1/2266* (2013.01); *H01Q 1/526* (2013.01)

(58) Field of Classification Search
CPC ............................ H01Q 1/2266; H01Q 1/526
See application file for complete search history.

(56) References Cited

U.S. PATENT DOCUMENTS

| | | | | |
|---|---|---|---|---|
| 2012/0293376 A1* | 11/2012 | Hung | H01Q 9/42 343/702 |
| 2014/0361930 A1* | 12/2014 | Liu | H01Q 9/42 343/700 MS |
| 2015/0263410 A1* | 9/2015 | Hwang | H01Q 5/371 343/702 |
| 2017/0309993 A1 | 10/2017 | Tu et al. | |
| 2020/0014092 A1 | 1/2020 | Wei et al. | |

* cited by examiner

*Primary Examiner* — Dameon E Levi
*Assistant Examiner* — Michael M Bouizza
(74) *Attorney, Agent, or Firm* — MUNCY, GEISSLER, OLDS & LOWE, P.C.

(57) ABSTRACT

An antenna assembly adapted to be assembled to a desktop computer includes a shielding body and an antenna body. The shielding body includes a first wall, two first shielding walls, and two second shielding walls. The first wall is connected to the two first shielding walls and the two second shielding walls and faces an outside of the desktop computer. The antenna body is at the first wall of the shielding body, and one or more portion of the antenna body is connected to the first shielding wall or the second shielding wall. The antenna body is operated at a frequency range of 2400 MHz and 2500 MHz or between 5150 MHz and 7125 MHz.

20 Claims, 14 Drawing Sheets

ANTENNA ASSEMBLY

CROSS-REFERENCES TO RELATED APPLICATIONS

This non-provisional application claims priority under 35 U.S.C. § 119(a) to Patent Application No. 111207886 filed in Taiwan, R.O.C. on Jul. 21, 2022 and Patent Application No. 111209616 filed in Taiwan, R.O.C. on Sep. 2, 2022, the entire contents of which are hereby incorporated by reference.

FIELD OF THE INVENTION

The instant disclosure relates to an antenna assembly, and more particular to an antenna assembly applicable to a desktop computer.

BACKGROUND

With the advancement of wireless network technologies, the wireless communication on a modern desktop computer can be achieved. Therefore, the number of wired hubs can be reduced, thereby reducing the number of the wirings to operate the desktop computer. Therefore, the operating environment for the desktop computer can be much neater and more comfortable, and allowing for more flexible the space allocation.

SUMMARY OF THE INVENTION

Antennas commonly operate within frequency bands, such as those bands used in the Wi-Fi 6E specification, which span from are 2400 MHz to 2500 MHz and 5150 MHz to 7125 MHz. Such antennas do not encounter frequency interference issues. However, with the recent changes of the specification of memories, the lastest DDR5 memory operates within a frequency with a frequency range of 4800 MHz to 6400 MHz. The DDR5 memory is typically plugged on the motherboard in close proximity to the network interface card. The frequency band generated by the memory overlaps with the 5150-7125 MHz frequency band specified for the Wi-Fi 6E specification. Therefore, under practical testing, noises are prone to be generated around the 6000 Mhz frequency band, which interferes with the network communication of the desktop computer.

To address the problem encountered in the prior arts, an antenna assembly is provided in accordance with one or several embodiments. The antenna assembly is adapted to be assembled to a desktop computer and comprises a shielding body and an antenna body. The shielding body comprises a first wall, two first shielding walls, and two second shielding walls. The first wall is connected to the two first shielding walls and the two second shielding walls. The first wall faces an outside of the desktop computer. The antenna body is at the first wall of the shielding body, and at least one portion of the antenna body is connected to one of the two first shielding walls or one of the two second shielding walls. The antenna body operates within a frequency range of 2400 MHz to 2500 MHz or 5150 MHz to 7125 MHz.

In some embodiments, the shielding body comprises an insulated body and a shielding layer, and the insulated body is integrally formed as a single structure or a one-piece structure. The shielding layer is coated on at least two first side surfaces and at least two second side surfaces of the insulated body so as to create the two first shielding walls and the two second shielding walls. Additionally, the shielding layer is connected to the at least one portion of the antenna body.

More specifically, in some embodiments, the antenna assembly further comprises a fixation base. The fixation base is connected to the insulated body and is adapted to be assembled with a chassis of the desktop computer, and the shielding layer is on a surface of the fixation base.

In some embodiments, the shielding body comprises a shielding housing and a circuit board, the circuit board is assembled with the shielding housing, and the circuit board is provided as the first wall of the shielding body.

More specifically, in some embodiments, the shielding housing is a metal housing.

Moreover, in some embodiments, the antenna assembly further comprises an electrical conductive film. The electrical conductive film is at a portion of the circuit board and a portion of the shielding housing, and the electrical conductive film is connected to the at least one portion of the antenna body.

More specifically, in some other embodiments, the shielding housing comprises an insulated housing and a shielding layer, the shielding layer encloses the insulated housing, and the at least one portion of the antenna body contacts the shielding layer.

More specifically, in some embodiments, the shielding housing comprises a connection portion, the two first shielding walls, and the two second shielding walls. The two first shielding walls and the two second shielding walls are connected to the connection portion, respectively. The two second shielding walls are in parallel with each other and connected to the two first shielding walls, respectively. A receiving space is between the connection portion, the two first shielding walls, and the two second shielding walls. The circuit board is provided with two first engaging portions. Each of the two second shielding walls is provided with a second engaging portion. The two first engaging portions extend into the receiving space, the second engaging portion of each of the two second shielding walls extends toward the receiving space, and each of the first engaging portions is engaged with a corresponding one of the second engaging portions.

Moreover, in some embodiments, one of the two second shielding walls has an engaging groove, the engaging groove is in communication with the receiving space, the circuit board is provided with an engaging block, a bottom portion of one of the two first engaging portions is on the engaging block, and one side of the engaging block is correspondingly engaged with the engaging groove.

Moreover, in some embodiments, the two first shielding walls further comprise a plurality of abutting members, and the abutting members respectively extend toward the receiving space from the two first shielding walls to abut against the circuit board.

Moreover, in some embodiments, the shielding housing further comprises a fixation base, the fixation base is connected to the connection portion, and the fixation base is adapted to be assembled with a chassis of the desktop computer.

More specifically, in some embodiments, the shielding housing comprises a top wall, the two first shielding walls, and the two second shielding walls. The two first shielding walls and the two second shielding walls are connected to the top wall, respectively. The two first shielding walls are in parallel with each other. The two second shielding walls are in parallel with each other and connected to the two first shielding walls, respectively. A receiving space is between the top wall, the two first shielding walls, and the two second shielding walls. The circuit board is provided with two first engaging portions. The two second shielding walls are provided with two second engaging portions. The two first engaging portions extend into the receiving space, the two second engaging portions extend toward the receiving space from the two second shielding walls, and each of the first engaging portions is engaged with a corresponding one of the second engaging portions.

Moreover, in some embodiments, one of the two second shielding walls has an engaging groove, the engaging groove is in communication with the receiving space, the circuit board is provided with an engaging block, a bottom portion of one of the two first engaging portions is on the engaging block, and one side of the engaging block is correspondingly engaged with the engaging groove.

Moreover, in some embodiments, the two first shielding walls further comprise a plurality of abutting members, and the abutting members respectively extend toward the receiving space from the two first shielding walls to abut against the circuit board.

Moreover, in some embodiments, the shielding housing further comprises a fixation base, the fixation base is connected to one of the two first shielding walls and extends away from the receiving space, and the fixation base is adapted to be assembled with a chassis of the desktop computer.

In some embodiments, the antenna body comprises a peripheral portion, a radiation portion, a signal feed-in portion, and a welding portion. The peripheral portion is on a periphery of a surface of the circuit board and contacts one of the two first shielding walls or one of the two second shielding walls. The peripheral portion surrounds the radiation portion, the signal feed-in portion is on the radiation portion and configured to be connected to a signal feed-in wire, and the welding portion is on the periphery portion and configured to be welded with the signal feed-in wire.

More specifically, in some embodiments, the antenna body comprises a bridging portion connected between the peripheral portion and the radiation portion.

More specifically, in some embodiments, the peripheral portion has a notch.

In some embodiments, the antenna body comprises a side edge portion, a radiation portion, a signal feed-in portion, and a welding portion. The side edge portion is at one side of the first wall and connected to one of the two first shielding walls or one of the two second shielding walls. The radiation portion is at one side of the side edge portion, the signal feed-in portion is on the radiation portion and configured to be connected to a signal feed-in wire, and the welding portion is on the side edge portion and configured to be welded with the signal feed-in wire.

Another antenna assembly is also provided. The antenna assembly is adapted to be assembled to a desktop computer and comprises an insulated body, a shielding layer, and an antenna body. The insulated body comprises a first wall, two first side walls, two second side walls, a connection portion, and a fixation base. A solid portion is between the first wall, the two first side walls, the two second side walls, and the connection portion. The first wall faces an outside of the desktop computer. The two first side walls and the two second side walls extend from a periphery of the first wall, and the two first side walls are in parallel with each other. One of two ends of each of the two second side walls away from the first wall is connected to the connection portion, and the fixation base extends from one side of the connection portion and is adapted to be assembled with a chassis of the desktop computer. The shielding layer is coated on the two first side surfaces, the two second side surfaces, the connection portion, and a surface of the fixation base. The antenna body is at a first surface of the first wall. At least one portion of the antenna body is connected to the shielding layer, and the antenna body operates within a frequency range of 2400 MHz to 2500 MHz or 5150 MHz and 7125 MHz.

As above, according to one or some embodiments of the instant disclosure, due to the shielding effect of the shielding body, when the antenna assembly is installed on the desktop computer, the antenna assembly can shield the frequency generated by the desktop computer, particularly those caused by the DDR5 memory. Therefore, the antenna assembly can reduce interference produced by the antenna body in the approximately 6000 MHz frequency band, thereby increasing the efficiency in wireless communication of the desktop computer.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
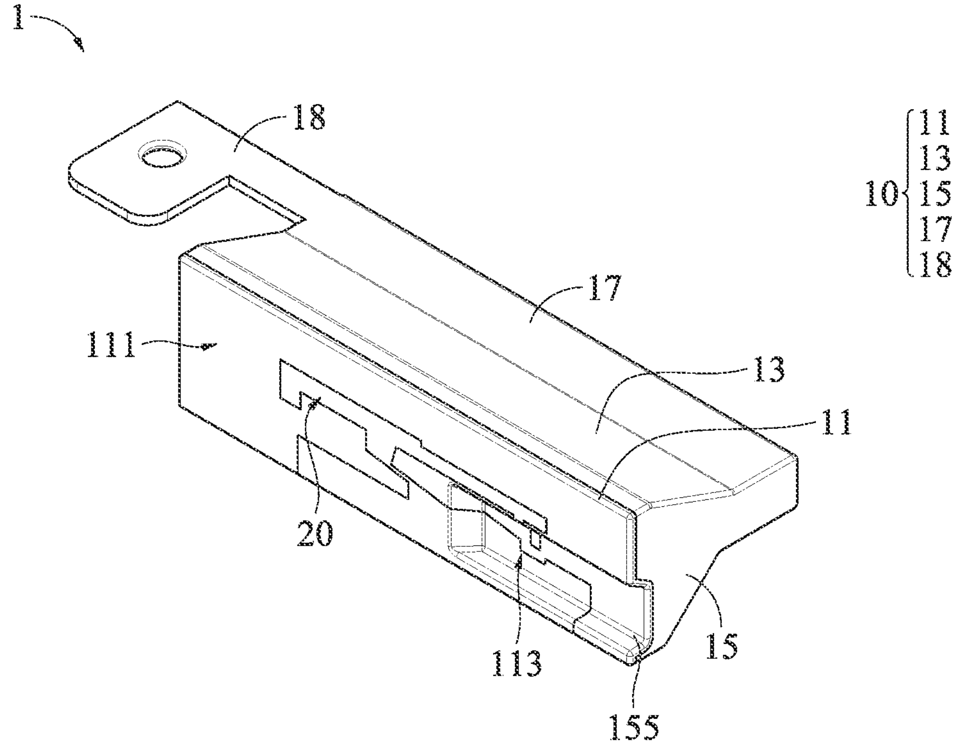
FIG. 1 illustrates a perspective view of an antenna assembly according to a first embodiment of the instant disclosure.

In the following descriptions, it will be understood that, although the terms “first”, “second”, “third”, etc. may be used herein to describe various elements, components, regions, and/or sections, these terms are only used to distinguish these elements, components, regions, and/or sections, rather than are used to represent the definite order of these elements, components, regions, and/or sections. Moreover, spatially relative terms, such as “beneath,” “below,” “lower,” “above,” “upper,” and the like, may be used herein for ease of description to describe one element or feature’s relationship to another element(s) or feature(s) as illustrated in the drawings. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. In other words, these terms only represent a relative position relationship between the described components, not an absolute position relationship between the described components.

In the drawings, for the sake of clarity, the sizes of some elements and regions are magnified. In the whole description, the identical reference number indicates the identical element. It should be understood that, when an element is referred to as being "on", "connected to", or "disposed on" another element, it may be directly on, connected to, or disposed on the other element, or one or more intervening elements may also be present. On the contrary, when one element is referred to as being "directly (disposed) on" or "directly connected to" another element, it can be clearly understood that there are no intervening elements between the two elements.

Figure 2:
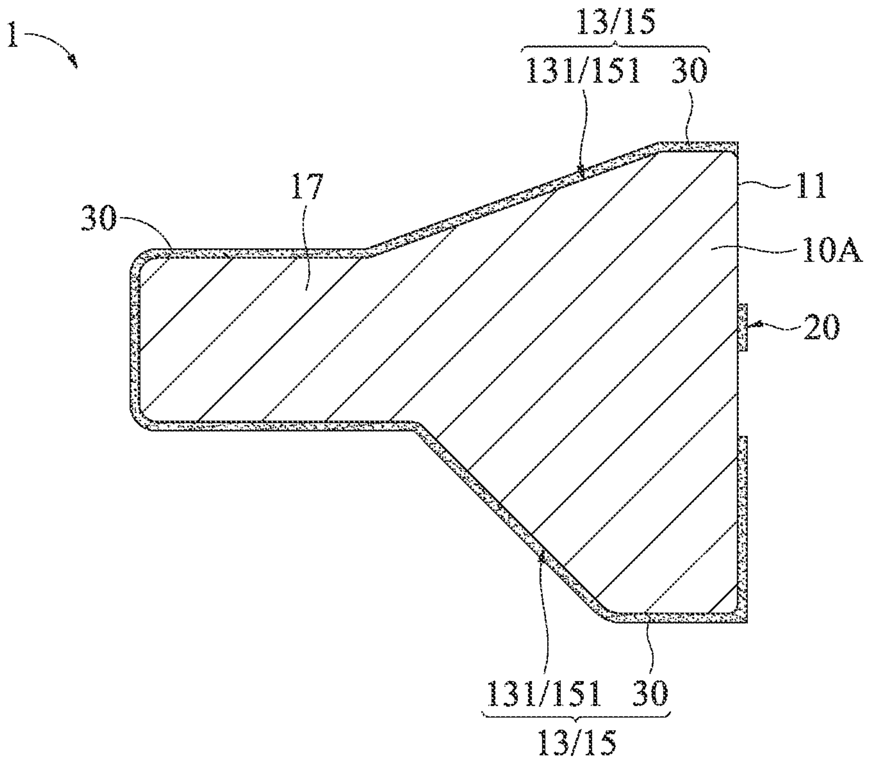
FIG. 2 illustrates a partial cross-sectional view of the antenna assembly of the first embodiment.
Figure 3A:
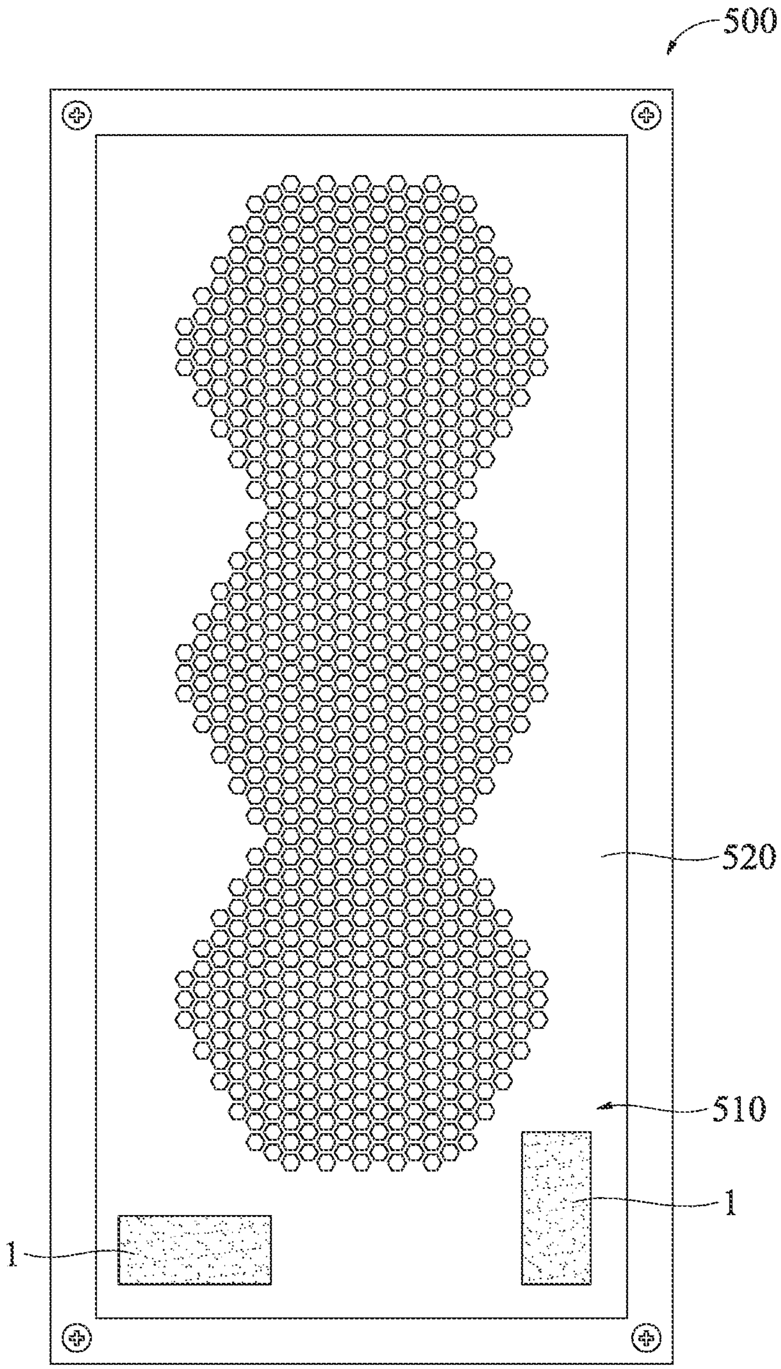
FIG. 3A and FIG. 3B illustrate assembled schematic views of an antenna assembly according to some embodiments of the instant disclosure.
Figure 3B:
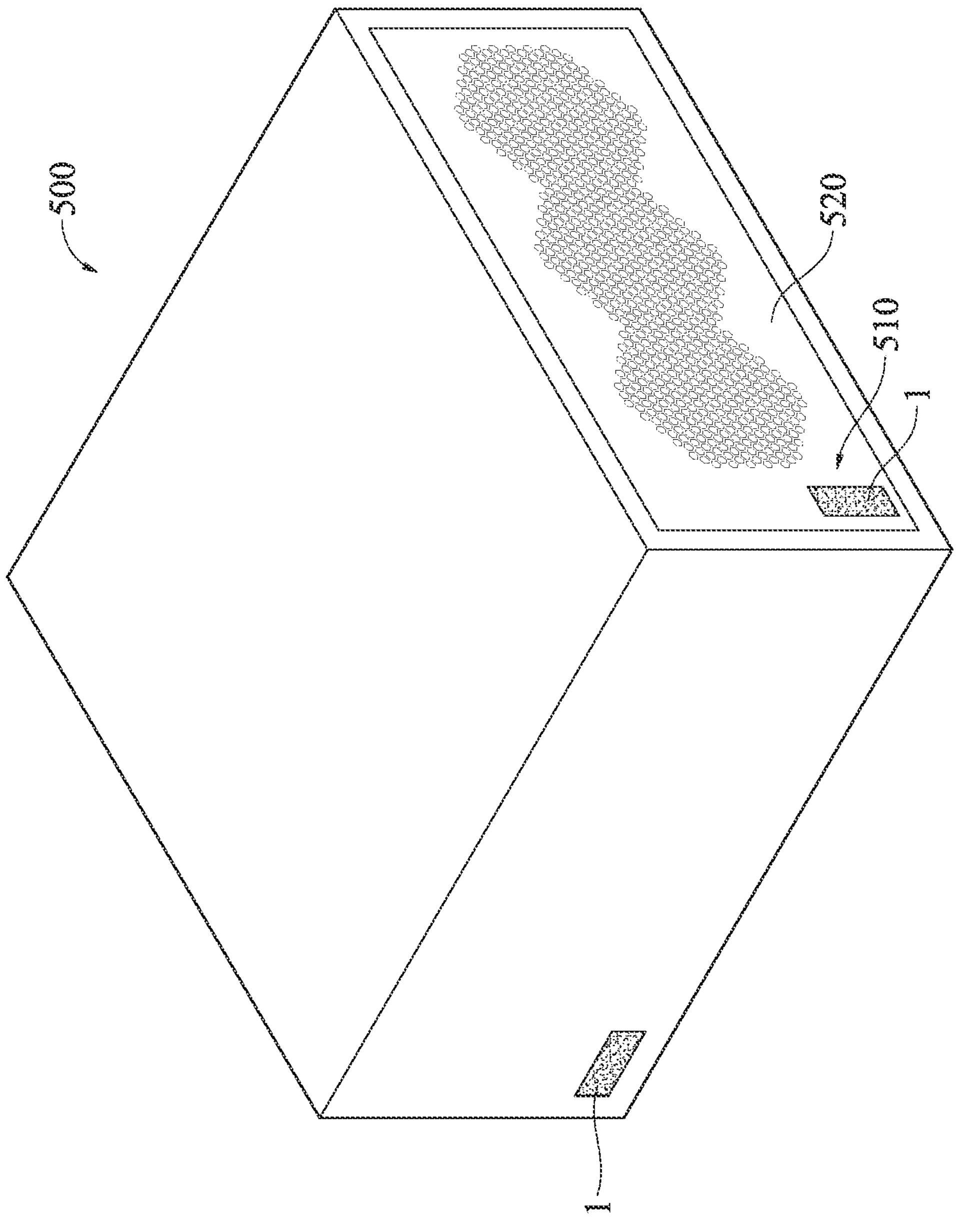

FIG. 1 illustrates a perspective view of an antenna assembly according to a first embodiment of the instant disclosure. FIG. 2 illustrates a partial cross-sectional view of the antenna assembly of the first embodiment. FIG. 3A and FIG. 3B illustrate assembled schematic views of an antenna assembly according to some embodiments of the instant disclosure. As shown in FIG. 1, FIG. 2, FIG. 3A, and FIG. 3B, the antenna assembly 1 is adapted to be assembled on a desktop computer 500. The antenna assembly 1 comprises a shielding body 10 and an antenna body 20. The shielding body 10 comprises a first wall 11, two first shielding walls 13, and two second shielding walls 15. The first wall 11 is connected to the two first shielding walls 13 and the two second shielding walls 15. The first wall faces an outside of the desktop computer 500. Specifically, in some embodiments, a first surface 111 of the first wall 11 is exposed from an outer surface 510 of the desktop computer 500. In general, the antenna assembly 1 is on a chassis 520 of the desktop computer 500, and the antenna assembly 1 is on a surface of the chassis 520 for configuring the I/O port or on an undetachable surface of the chassis 520. Therefore, when the user disassembles the chassis of the desktop computer 500, such configuration prevents the antenna assembly 1 from being damaged. As shown in FIG. 3A, the antenna assembly 1 may be either disposed at the front I/O port of the desktop computer 500 or at the rear I/O of the desktop computer 500; alternatively, in some embodiments, the antenna assembly 1 may be disposed on one of the side surfaces of the desktop computer 500 as shown in FIG. 3B. It is noted that, the drawings are provided for illustrative purposes, but not limitations for the instant disclosure.

The antenna body 20 is at the first wall 11 of the shielding body 10, and at least one portion of the antenna body 20 is connected to one of the two first shielding walls 13 or one of the two second shielding walls 15. The antenna body 20 operates within a frequency range of 2400 MHz to 2500 MHz or 5150 MHz to 7125 MHz, which mainly corresponds to the range of Wi-Fi specification. More specifically, in this embodiment, the antenna body 20 is at the first surface 111 of the first wall 11, that is, the outer surface of the first wall 11 in this embodiment.

Please refer to FIG. 1 again. In the first embodiment, the antenna body 10 further comprises a connection portion 17. In this embodiment, the connection portion 17 is a pillar structure; however, such configuration is just provided for illustrative purposes, the instant disclosure is not limited thereto. The two first shielding walls 13 and the two second shielding walls 15 are respectively connected to the connection portion 17. The two second shielding walls 15 are in parallel with each other, and the two second shielding walls 15 are respectively connected to the two first shielding walls 13.

Please refer to FIG. 1 and FIG. 2 again. In this embodiment, the shielding body 10 is a solid structure; in other words, in this embodiment, a solid portion is between the first wall 11, the two first side walls 13, the two second side walls 15, and the connection portion 17. More specifically, in this embodiment, an insulated body 10A is inside the shielding body 10. The insulated body may be made of, for example, plastic, rubber, acrylic, or the like. A shielding layer 30 which may be made of conductive material, for example, a metal layer, a graphite layer, or the like, is coated on two first side surfaces 131 of the two first shielding walls 13, two second side surfaces 151 of the two second shielding walls 15, and a surface of the connection portion 17, so that the shielding layer 30 is at least formed as the two first shielding walls 13 and the two second shielding walls 15 of the shielding body 10. More specifically, in this embodiment, upon manufacturing the antenna assembly 1, fine rough structures are formed on the surface of the first wall 11, the two first side surfaces 131, the two second side surfaces 151, and the surface of the connection portion 17 by surface scoring, acidic treatment, etching, laser engraving, electrical discharge machining, or the like. Next, electroplating or other coating techniques are applied to coat a conductive film (such as a metal film) on these surfaces to form the shielding layer 30. Furthermore, through the masking procedure, the antenna body can be formed upon performing the coating procedure.

Moreover, in this embodiment, the antenna assembly 1 further comprises a fixation base 18. The fixation base 18 is connected to the shielding body 10; the fixation base 18 and the shielding body 10 may be integrally formed as a one-piece structure or may be assembled with each other. More specifically, in some embodiments, the fixation base 18 extends from the connection portion 17. The fixation base 18 is adapted to be assembled with the chassis 520 of the desktop computer 500, and the shielding layer 30 is further on the surface of the fixation base 18.

Moreover, in some embodiments, a portion of the first wall 11 has a recessed portion 113 and a portion of one of the two second shielding walls 15 has an engaging groove 155. Therefore, the assembling of a signal feed-in wire 600 (not shown in FIG. 1; as shown in FIG. 4, FIG. 5, and FIG. 8 to FIG. 10) can be achieved conveniently.

Figure 4:
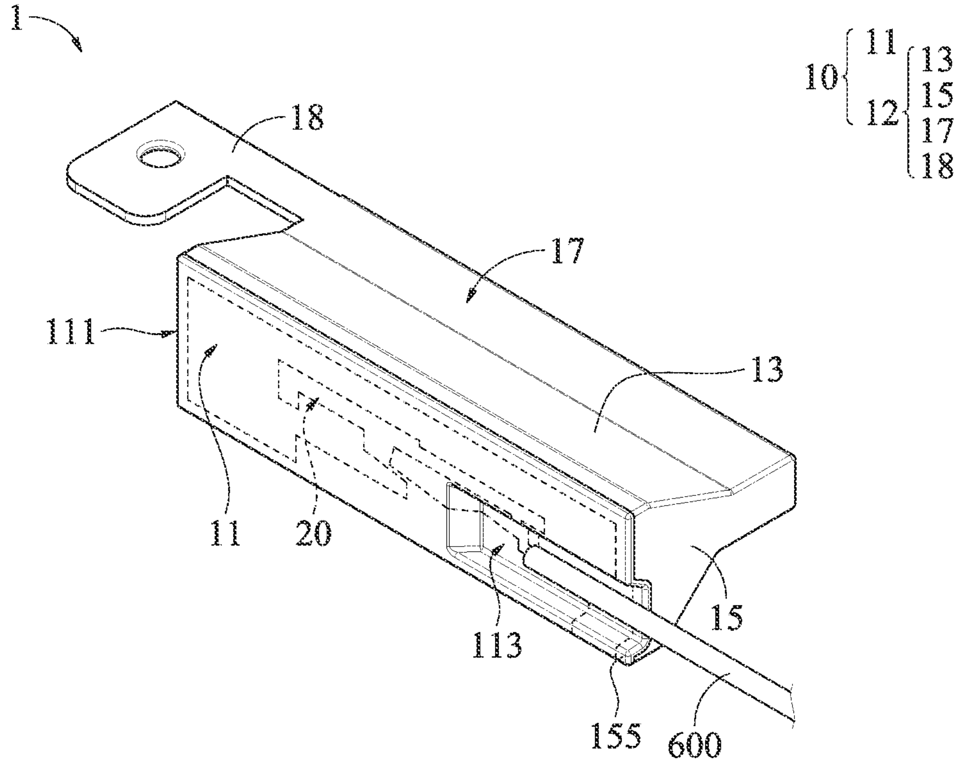
FIG. 4 illustrates a perspective view of an antenna assembly according to a second embodiment of the instant disclosure.
Figure 5:
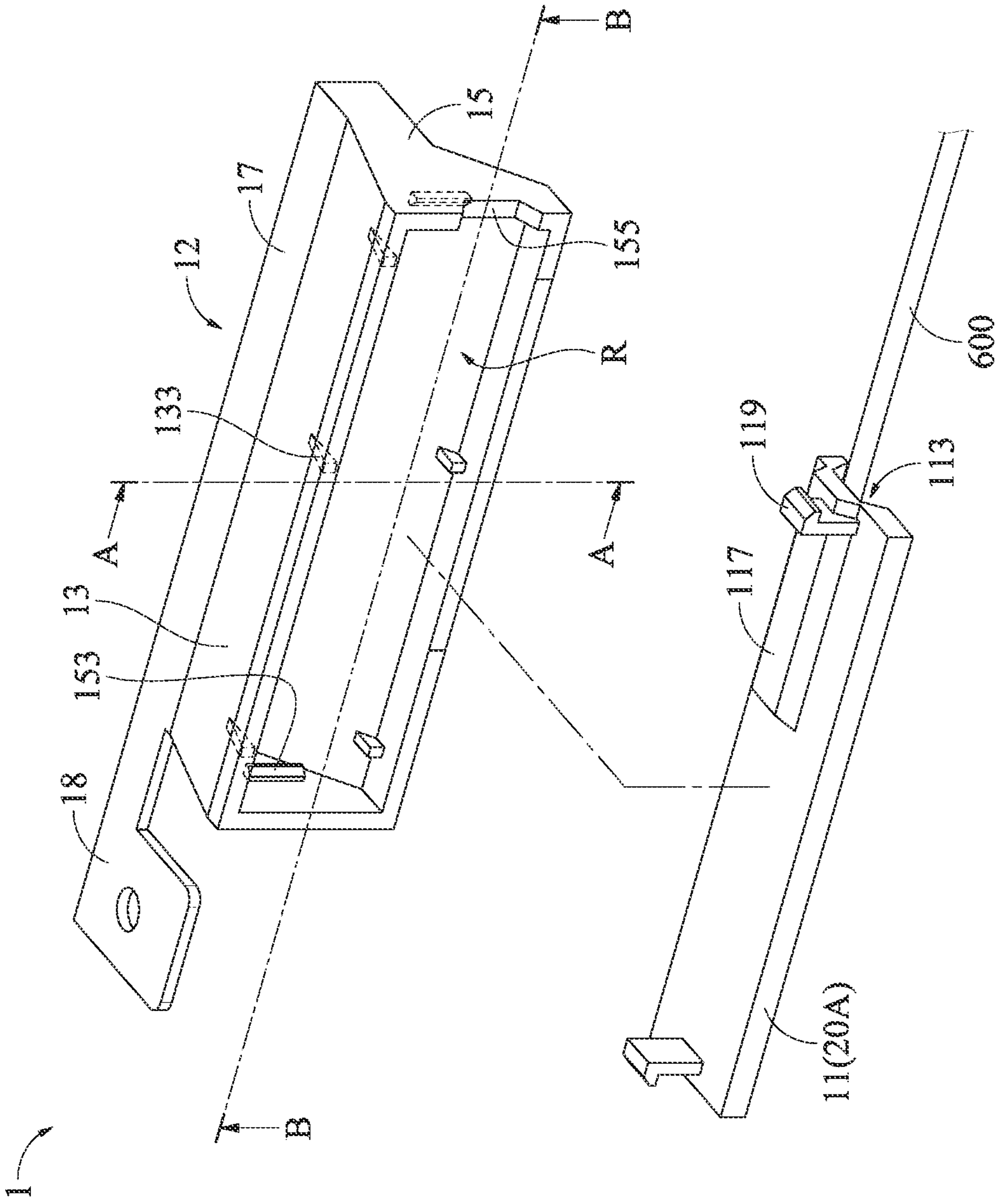
FIG. 5 illustrates an exploded view of the antenna assembly of the second embodiment.
Figure 6A:
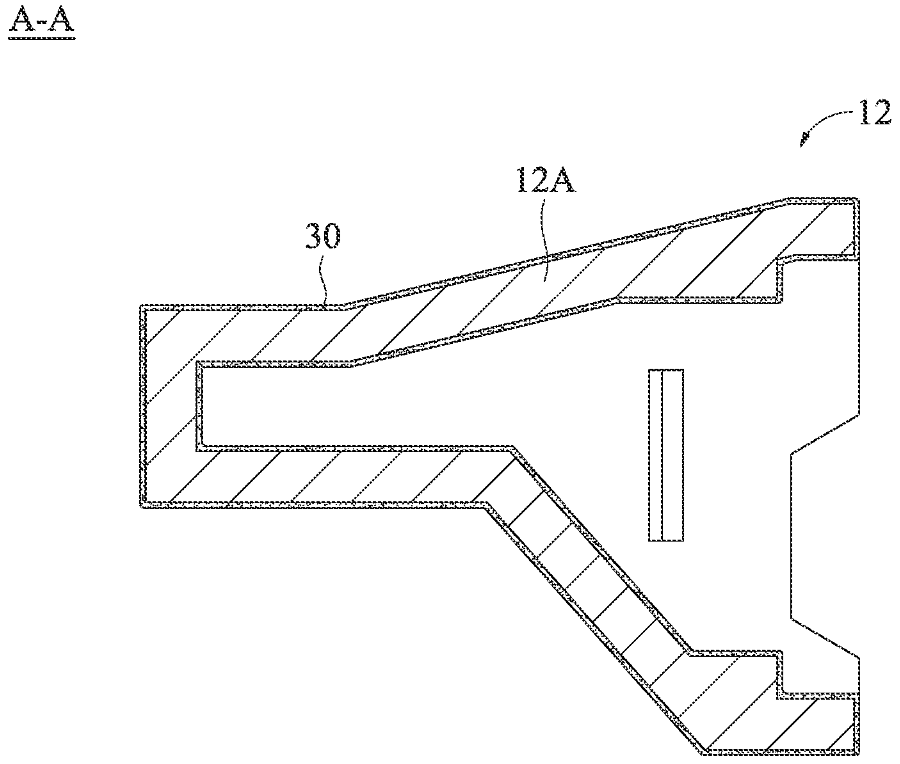
FIG. 6A and FIG. 6B respectively illustrate cross-sectional views along the line A-A and the line B-B shown in FIG. 5.
Figure 6B:
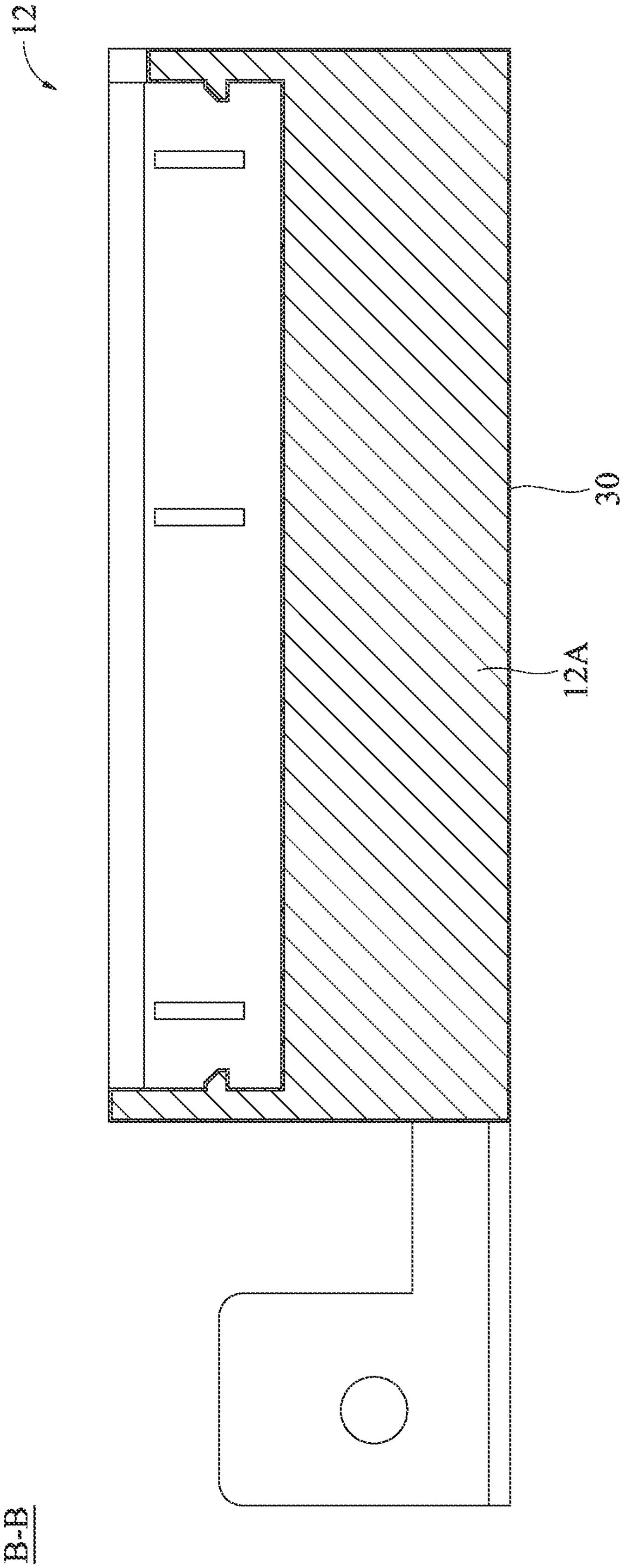

FIG. 4 illustrates a perspective view of an antenna assembly according to a second embodiment of the instant disclosure. FIG. 5 illustrates an exploded view of the antenna assembly of the second embodiment. FIG. 6A and FIG. 6B respectively illustrate cross-sectional views along the line A-A and the line B-B shown in FIG. 5. As shown in FIG. 4 and FIG. 5, the difference between the second embodiment and the first embodiment is at least that, in this embodiment, the shielding body 10 comprises a shielding housing 12 and a circuit board 20A, the circuit board 20A is assembled with the shielding housing 12, and the circuit board 20A is provided as the first wall 11 of the shielding body 10. In other words, in this embodiment, the circuit board 20A and the antenna body 20 together form the radiation member to be assembled with the shielding housing 12. Through the two-piece configuration, the design of the antenna body 20, the manufacture of the radiation member, and the manufacture of the shielding housing 12 can be separately, thus allowing the manufacture and design of different parts of the antenna assembly 1 can be achieved at the same time to accelerate the overall manufacturing process of the antenna assembly 1.

As mentioned above, FIG. 6A and FIG. 6B respectively illustrate cross-sectional views along the line A-A and the line B-B shown in FIG. 5. Please also refer to FIG. 1 and FIG. 2. The shielding housing 12 comprises an insulated housing 12A and a shielding layer 30. The shielding layer 30 encloses the insulated housing 12A. More specifically, in some embodiments, the shielding layer 30 may be an electroplating metal layer or an electroless metal layer fully covering the inner and outer surfaces of the insulated housing 12A. Therefore, according to some embodiments, the overall manufacturing costs for the antenna assembly 1 can be much cheaper, and the antenna assembly can be manufactured rapidly according to various specifications. The shielding housing 12 usually faces the interior of the desktop computer 500 to shield the frequency generated by the DDR5 memory so as to reduce the noises at about 6000 MHz generated by the antenna body 20. The shielding layer 30, in addition to being provided for electromagnetic shielding, may further contact at least one portion of the antenna body 20 for grounding purpose.

Please refer to FIG. 5. The shielding layer 12 comprises a connection portion 17, two first shielding walls 13, and two second shielding walls 15. The two first shielding walls 13 and the two second shielding walls 15 are respectively connected to the connection portion 17. The connection portion 17 faces the circuit board 20A, the two second shielding walls 15 are in parallel with each other and are respectively connected to the two first shielding walls 13. The two first shielding walls 13 may be of a symmetrical configuration or a non-symmetrical configuration. A receiving space R is between the connection portion 17, the two first shielding walls 13, and the two second shielding walls 15. The circuit board 20A is provided with two first engaging portions 119, each of the two second shielding walls 15 is provided with a second engaging portion 153, the two first engaging portions 119 extend into the receiving space R, the two second engaging portions 153 extend toward the receiving space R, and each of the first engaging portions 119 is engaged with a corresponding one of the second engaging portions 153.

In this embodiment, the first engaging portion 119 is a hook extending upward, and the second engaging portion 153 is a protruding buckle; however, such configuration is provided for illustrative purposes, not limitations to the instant disclosure. In some embodiments, the structures of the first engaging portion 119 and the second engaging portion 153 may be exchanged or modified according to actual design demands.

Please refer to FIG. 5 again. In some embodiments, the shielding housing 12 further comprises a plurality of abutting members 133. The abutting members 133 respectively extend toward the receiving space R from the two first shielding walls 13 to abut against the circuit board 20A. Therefore, the components of the antenna assembly 1 can be assembled more closely. The abutting members 133 may be protrusions extending from the two first shielding walls 13 to abut against the side portion of the circuit board 20A.

Moreover, in some embodiments, one of the two second shielding walls 15 has an engaging groove 155, the engaging groove 155 is in communication with the receiving space R, the circuit board 20A is provided with an engaging block 117, a bottom portion of one of the two first engaging portions 119 is on the engaging block 117, and one side of the engaging block 117 is correspondingly engaged with the engaging groove 115. Moreover, a recessed portion 113 is on a surface of the circuit board 20A, the recessed portion 113 extends toward one side portion of the circuit board 20A. The shape of one end of the recessed portion 113 substantially corresponds to the shape of the engaging groove 155, and the recessed portion 155 are configured to receive and to weld to the signal feed-in wire 600.

Likewise, in this embodiment, the shielding housing 12 further comprises a fixation base 18, the fixation base 18 is connected to the connection portion 17, and the fixation base 18 is adapted to be assembled with the chassis 520 of the desktop computer 500.

Figure 7:
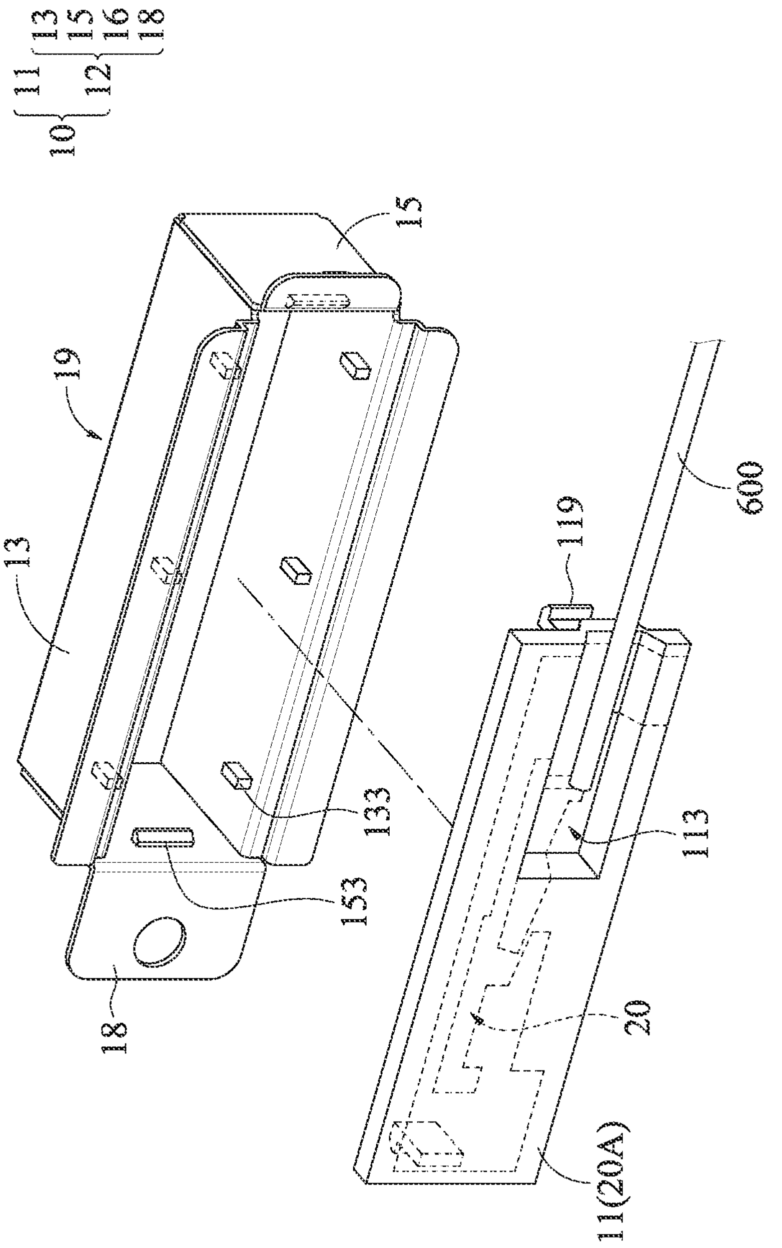
FIG. 7 illustrates an exploded view of an antenna assembly according to a third embodiment of the instant disclosure.

FIG. 7 illustrates an exploded view of an antenna assembly according to a third embodiment of the instant disclosure. As shown in FIG. 7 and also FIG. 5, the difference between the third embodiment and the first embodiment is at least the configuration of the shielding housing 12. In the third embodiment, the top of the shielding housing 12 is a flat plate structure. The shielding housing 12 comprises a top wall 19, two first shielding walls 13, and two second shielding walls 15. The two first shielding walls 13 and the two second shielding walls 15 are connected to the top wall 19, respectively. The two first shielding walls 13 are in parallel with each other, the two second shielding walls 15 are in parallel with each other, and the two second shielding walls 15 are connected to the two first shielding walls 13, respectively. A receiving space R is between the top wall 19, the two first shielding walls 13, and the two second shielding walls 15. The circuit board 20A is provided with two first engaging portions 119, the two second shielding walls 15 are provided with two second engaging portions 153, the two first engaging portions 119 extend into the receiving space R, the two second engaging portions 153 extend toward the receiving space R from inner sides of the two second shielding walls 15, and each of the first engaging portions 119 is engaged with a corresponding one of the second engaging portions 153. Moreover, in the third embodiment, the fixation base 18 is connected to one of the two second shielding walls 14 and extends away from receiving space R; however, such configuration is provided for illustrative purposes, not limitations of the instant disclosure. For example, in some embodiments, the fixation base 18 may be connected to and extend from one of the two first shielding walls 13 or one of the two second shielding walls 15.

Moreover, in the second embodiment and the third embodiment, the shielding housing 12 may be replaced by a metal housing. Furthermore, the antenna body 20 may be on any surface of the circuit board 20A.

Figure 8:
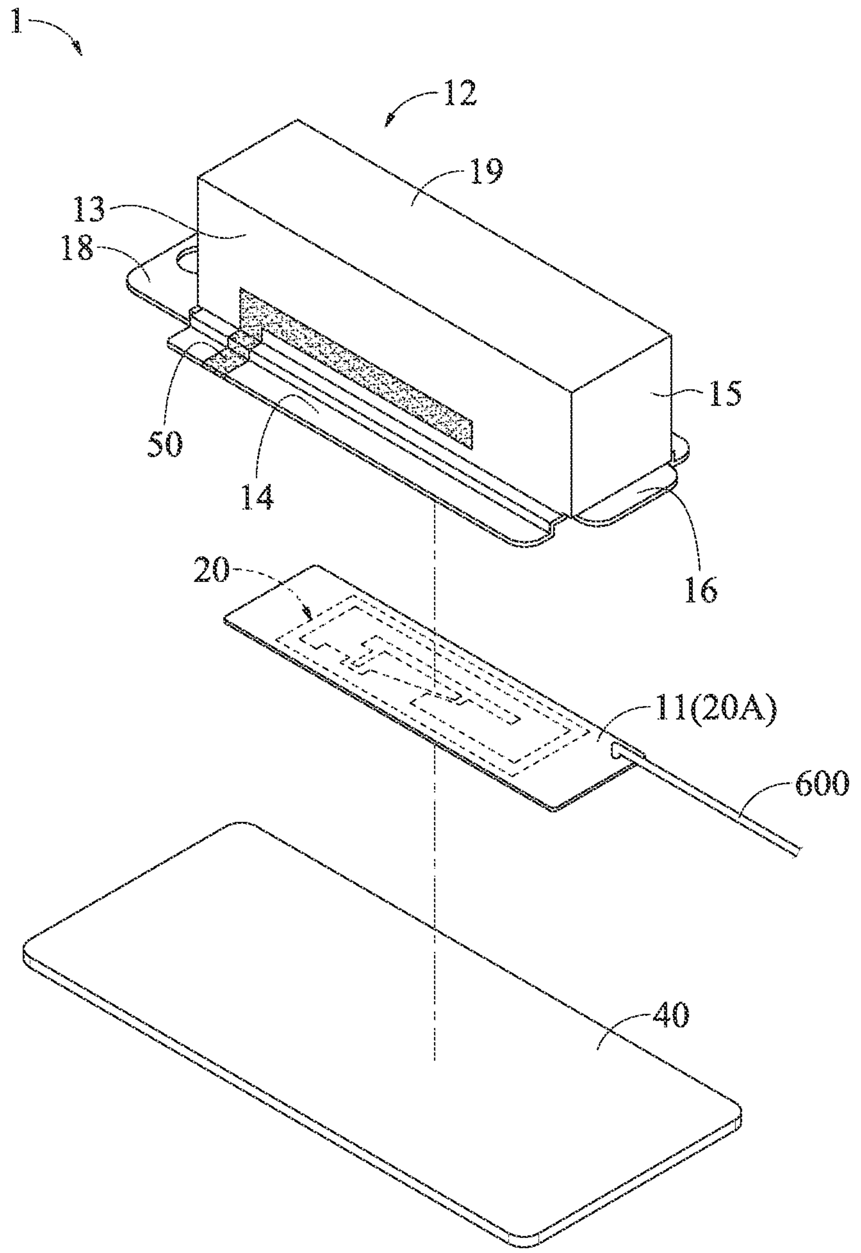
FIG. 8 illustrates an exploded view of an antenna assembly according to a fourth embodiment of the instant disclosure.

FIG. 8 illustrates an exploded view of an antenna assembly according to a fourth embodiment of the instant disclosure. In this embodiment, the shielding housing 12 is a metal housing. Moreover, in this embodiment, the antenna assembly 1 further comprises a cover plate 40. In other words, in this embodiment, the circuit board 20A and the shielding housing 12 are assembled with each other in an indirect manner; the shielding housing 12 is assembled with the cover plate 40, the circuit board 20A is on the cover plate 40, and the circuit board 20A is fixed between the shielding housing 12 and the cover plate 40. In this embodiment, the cover plate 40 is an insulated member. In this embodiment, the shielding housing 12 may be directly assembled on the chassis 520 of the desktop computer 500, so that the antenna body 20 on the circuit board 20A and the cover plate 40 faces the outside of the desktop computer 500.

Moreover, in some embodiments, the antenna assembly 1 further comprises an electrical conductive film 50. The electrical conductive film 50 is at a portion of the circuit board 20A and a portion of the shielding housing 12, and the electrical conductive film 50 is connected to at least one portion of the antenna body 20. Therefore, the shielding housing 12 is not only provided for shielding but also for the grounding of the antenna body 20.

Figure 9:
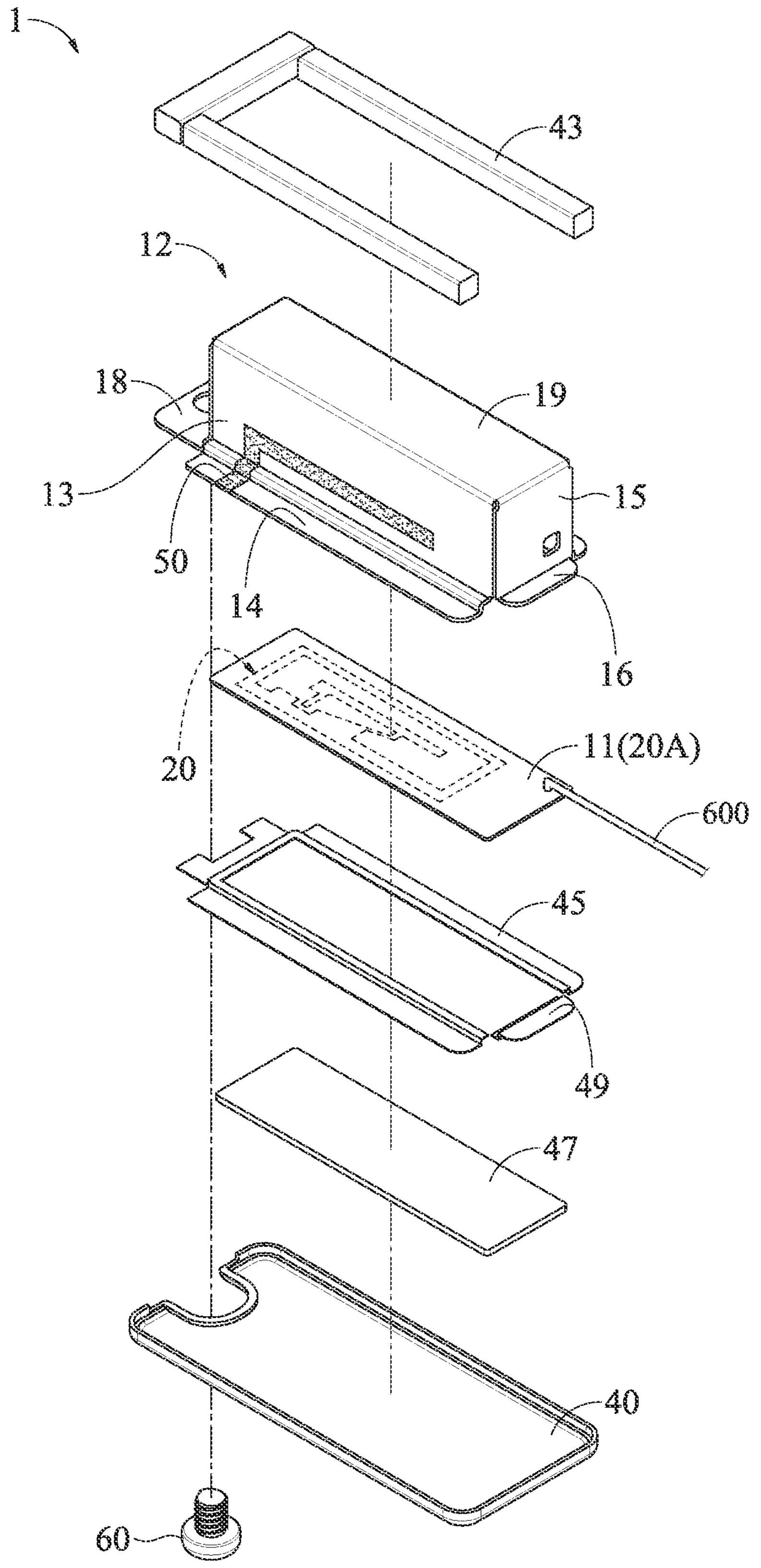
FIG. 9 illustrates an exploded view of an antenna assembly according to a fifth embodiment of the instant disclosure.

FIG. 9 illustrates an exploded view of an antenna assembly according to a fifth embodiment of the instant disclosure. In the fifth embodiment, the antenna assembly 1 further comprises a pressing member 43, an assembling member 45, a bottom plate 47, and a fixation member 60. The shielding housing 12 further comprises two first peripheral portions 14, a second peripheral portion 16, and a fixation base 18. The two first peripheral portions 14 extend from the two first shielding walls 13 in a direction substantially perpendicular to the two first shielding walls 13, and the second peripheral portion 16 and the fixation base 18 extend from the two second shielding walls 15 in a direction substantially perpendicular to the two second shielding walls 15. The bottom plate 47 loads the circuit board 20A and is disposed above the cover plate 40. The assembling member 45 surrounds three sides of the circuit board 20A and fixed on the bottom plate 47. The shielding housing 12 covers the cover plate 40. The pressing member 43 is fixed on the fixation base 18 and the first peripheral portion 14. The fixation member 60 may be locked with the fixation base 18, so that the fixation member 60 can be prevented from being detached off the fixation base 18 and the position of the circuit board 20A can be prevented from having offset. Moreover, one side of the assembling member 45 adjacent to the second peripheral portion 16 is provided with a washer 49 to prevent the position of the circuit board 20A from having offset.

Figure 10:
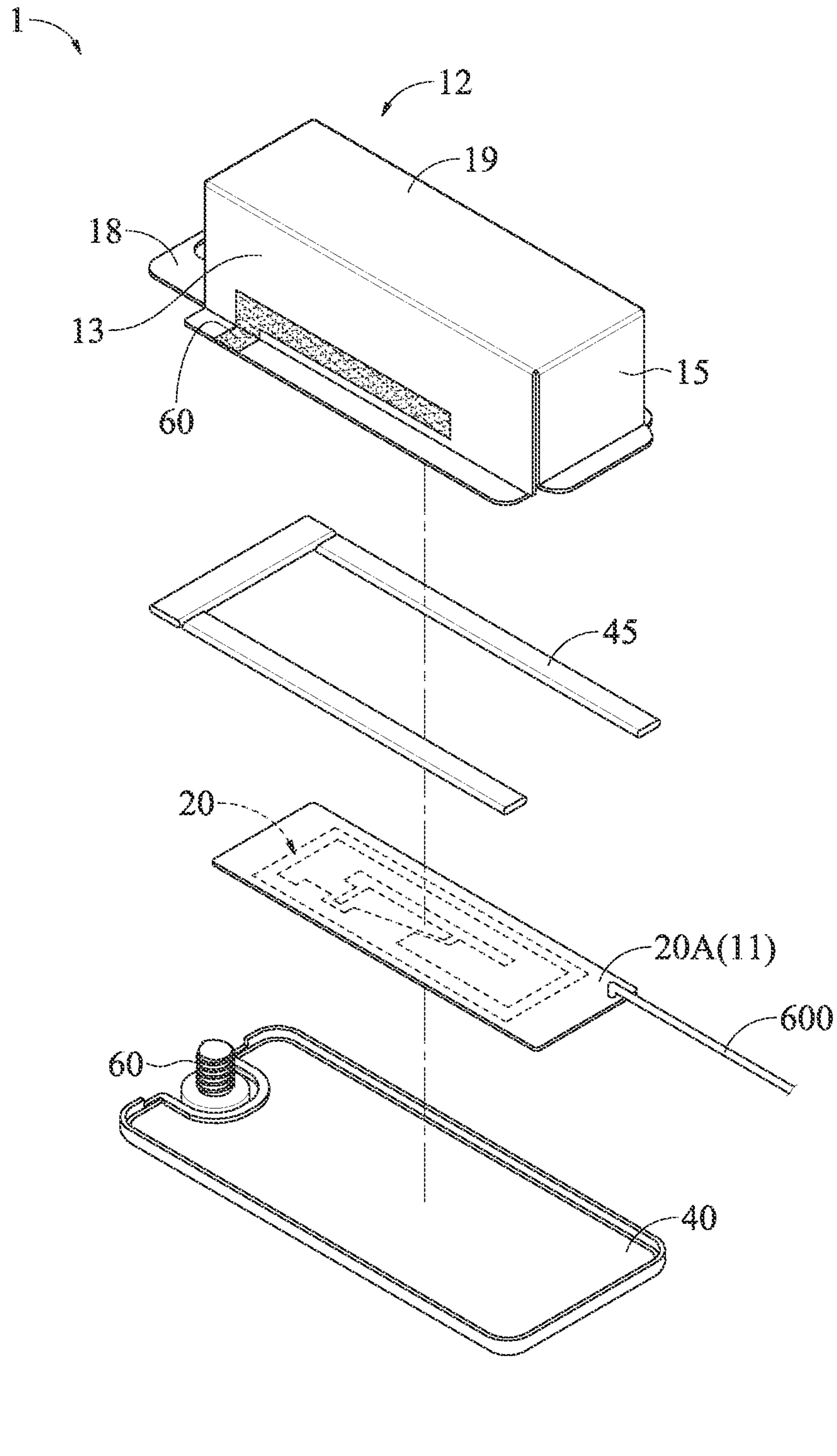
FIG. 10 illustrates an exploded view of an antenna assembly according to a sixth embodiment of the instant disclosure.

FIG. 10 illustrates an exploded view of an antenna assembly according to a sixth embodiment of the instant disclosure. Please refer to FIG. 10 and FIG. 9. In the sixth embodiment, the pressing member 43, the bottom plate 47, and the washer 49 are omitted, and in this embodiment, the shielding housing 12 and the cover plate 40 are fixed with each other just through the fixation member 60.

Figure 11:
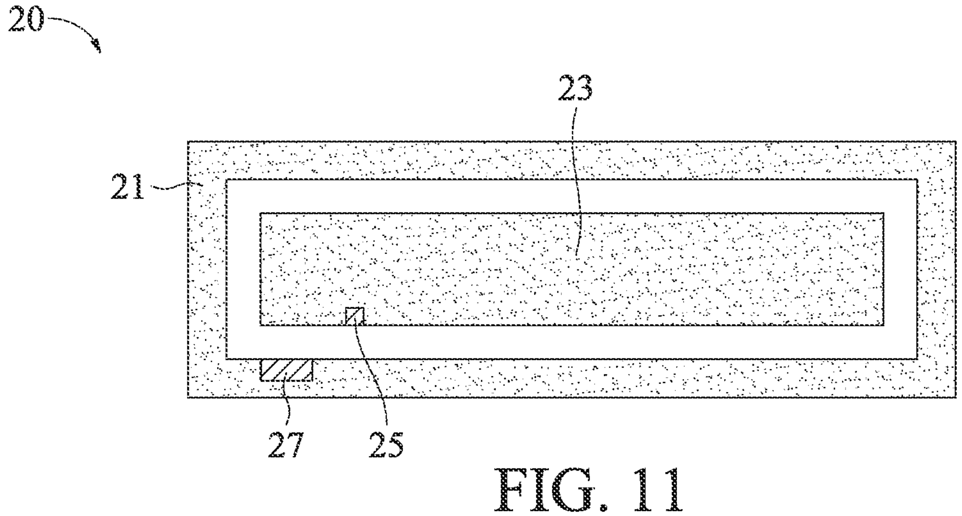
FIG. 11 to FIG. 16 illustrate schematic views of the antenna body of an antenna assembly according to some embodiments of the instant disclosure.
Figure 12:
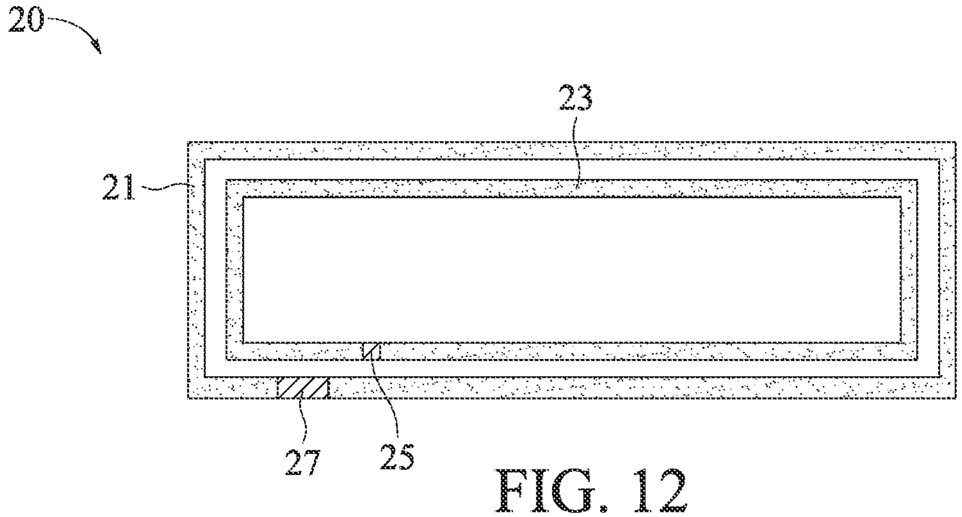

FIG. 11 to FIG. 16 illustrate schematic views of the antenna body of an antenna assembly according to some embodiments of the instant disclosure. As shown in FIG. 11 and FIG. 12, the antenna body 20 comprises a peripheral portion 21, a radiation portion 23, a signal feed-in portion 25, and a welding portion 27. The peripheral portion 21 is on a periphery of a surface of the circuit board 20A and contacts one of the two first shielding walls 13 or one of the two second shielding walls 15 for grounding. In this embodiment, the peripheral portion 21 surrounds the radiation portion 23. The radiation portion 23 may have patterns for various Wi-Fi bands. The radiation portion 23 may be a monopole antenna or a dipole antenna. The signal feed-in portion 25 is on the radiation portion 23 and configured to be connected to a signal feed-in wire 600. The welding portion 27 is on the periphery portion 21 and configured to be welded with the signal feed-in wire 600.

Figure 13:
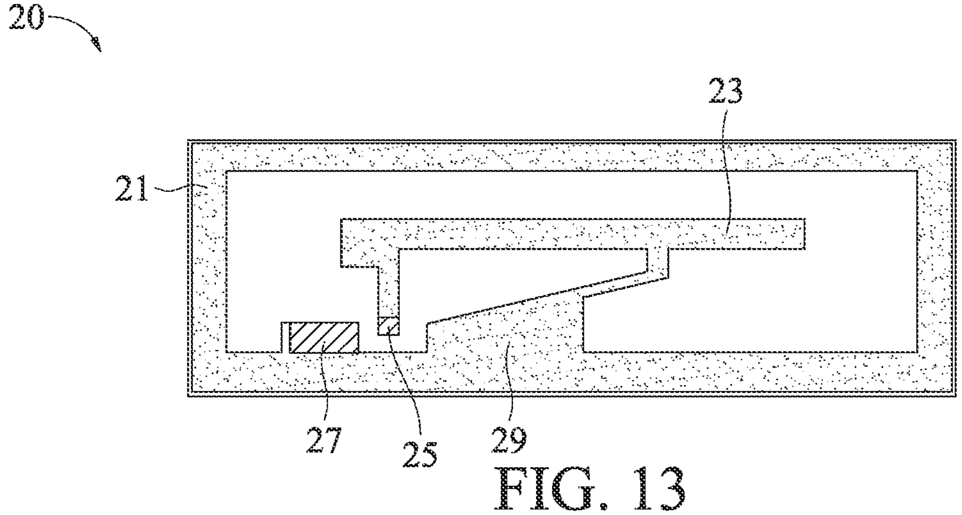
Figure 14:
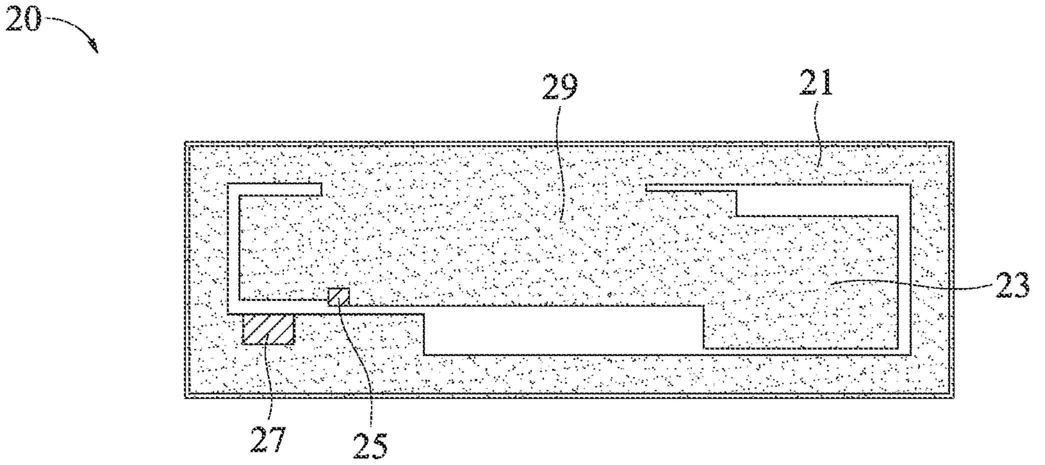

As shown in FIG. 13 and FIG. 14, the pattern of the antenna shown in FIG. 13 and FIG. 14 is different from the pattern of the antenna shown in FIG. 11 and FIG. 12. In this embodiment, the antenna body 20 comprises a bridging portion 29 connected between the peripheral portion 21 and the radiation portion 23.

Figure 15:
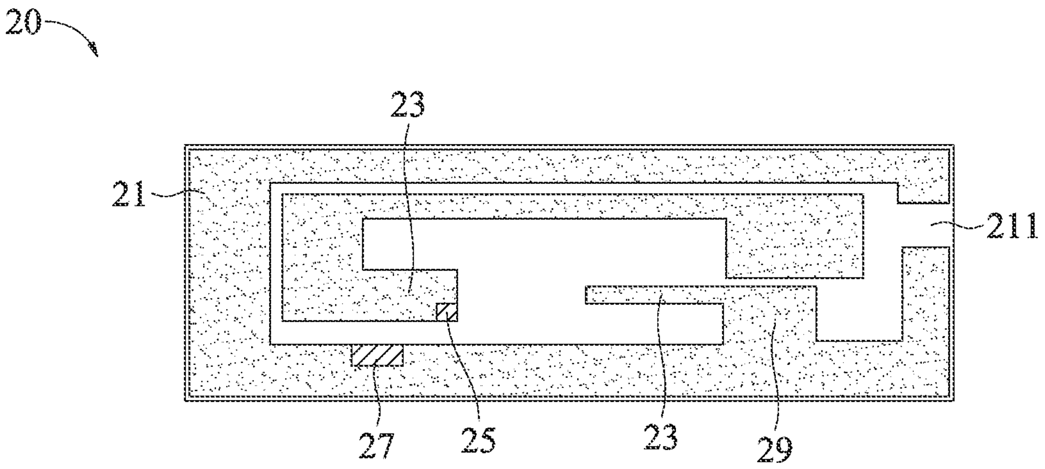

As shown in FIG. 15, the peripheral portion 21 has a notch 211. It is understood that, the aforementioned patterns of the antenna body 20 are provided for illustrative purposes, not limitations to the instant disclosure. Any pattern meeting Wi-Fi bands can be provided as the pattern of the antenna body 20.

Figure 16:
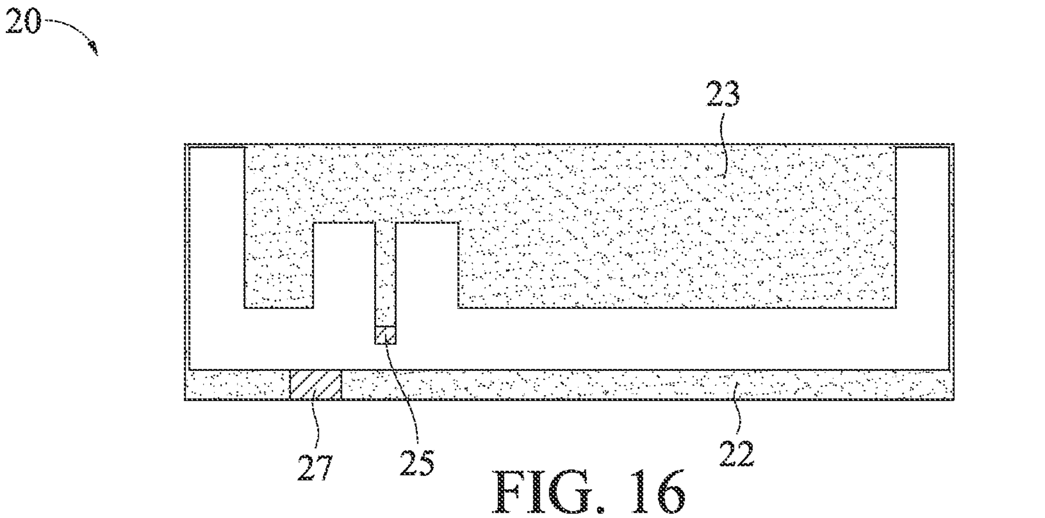

As shown in FIG. 16, in this embodiment, the configuration of the antenna body 20 is different from that shown in the aforementioned embodiments. In this embodiment, the antenna body 20 comprises a side edge portion 22, a radiation portion 23, a signal feed-in portion 25, and a welding portion 27. The side edge portion 22 is at one side of the first wall 11 and indirectly or directly connected to one of the two first shielding walls 13 or one of the two second shielding walls 15. The radiation portion 23 is at one side of the side edge portion 22. The signal feed-in portion 25 is on the radiation portion 23 and configured to be connected to a signal feed-in wire 600. The welding portion 27 is on the side edge portion 22 and configured to be welded with the signal feed-in wire 600.

As above, according to one or some embodiments of the instant disclosure, through the shielding effect of the shielding body, upon the antenna assembly is assembled on the desktop computer, the antenna assembly can shield the frequency generated from the desktop computer caused by the DDR5 memory. Therefore, noises generated by the antenna body at a frequency band about of 6000 MHz can be reduced, thereby increasing the efficiency in wireless communication of the desktop computer.

As above, according to one or some embodiments of the instant disclosure, through the shielding effect of the first shielding walls 13 and the second shielding walls 15 of the shielding body 10, upon the antenna assembly 1 is assembled on the desktop computer 500, the antenna assembly 1 can shield the frequency generated from the desktop computer 500 caused by the DDR5 memory. Therefore, noises generated by the antenna body 20 at a frequency band about of 6000 MHz can be reduced, thereby increasing the efficiency in wireless communication of the desktop computer 500.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An antenna assembly adapted to be assembled on a desktop computer, wherein the antenna assembly comprises:

a shielding body comprising a first wall, two first shielding walls, and two second shielding walls, wherein the first wall is connected to the two first shielding walls and the two second shielding walls, the first wall faces an outside of the desktop computer, a portion of the first wall has a recessed portion and a portion of one of the two second shielding walls has an engaging groove, and a shape of one end of the recessed portion substantially corresponds to a shape of the engaging groove; and an antenna body at the first wall of the shielding body, wherein at least one portion of the antenna body is connected to one of the two first shielding walls or one of the two second shielding walls, and the antenna body operates within a frequency range of 2400 MHz to 2500 MHz or 5150 MHz to 7125 MHz.

2. The antenna assembly according to claim 1, wherein the shielding body comprises an insulated body and a shielding layer, the insulated body is integrally formed as a one-piece structure, the shielding layer is coated on at least two first side surfaces and at least two second side surfaces of the insulated body to create the two first shielding walls and the two second shielding walls, and the shielding layer is connected to the at least one portion of the antenna body.

3. The antenna assembly according to claim 2, further comprising a fixation base, wherein the fixation base is connected to the insulated body and is adapted to be installed on a chassis of the desktop computer, and the shielding layer is further on a surface of the fixation base.

4. The antenna assembly according to claim 1, wherein the shielding body comprises a shielding housing and a circuit board, the circuit board is assembled with the shielding housing, the circuit board is provided as the first wall of the shielding body, the recessed portion is on a surface of the circuit board, and the recessed portion extends toward one side portion of the circuit board.

5. The antenna assembly according to claim 4, wherein the shielding housing is a metal housing.

6. The antenna assembly according to claim 5, further comprising an electrical conductive film, wherein the electrical conductive film is at a portion of the circuit board and a portion of the shielding housing, and the electrical conductive film is connected to the at least one portion of the antenna body.

7. The antenna assembly according to claim 4, wherein the shielding housing comprises an insulated housing and a shielding layer, the shielding layer encloses the insulated housing, and the at least one portion of the antenna body contacts the shielding layer.

8. The antenna assembly according to claim 4, wherein the shielding housing comprises a connection portion, the two first shielding walls, and the two second shielding walls; the two first shielding walls and the two second shielding walls are connected to the connection portion, respectively; the two second shielding walls are in parallel with each other and connected to the two first shielding walls, respectively; a receiving space is between the connection portion, the two first shielding walls, and the two second shielding walls; the circuit board is provided with two first engaging portions, each of the two second shielding walls is provided with a second engaging portion, the two first engaging portions extend into the receiving space, the second engaging portion of each of the two second shielding walls extends toward the receiving space, each of the first engaging portions is engaged with a corresponding one of the second engaging portions, and the engaging groove is in communication with the receiving space.

9. The antenna assembly according to claim 8, wherein one of the two second shielding walls has an engaging groove, the engaging groove is in communication with the receiving space, the circuit board is provided with an engaging block, a bottom portion of one of the two first engaging portions is on the engaging block, and one side of the engaging block is correspondingly engaged with the engaging groove.

10. The antenna assembly according to claim 8, wherein the two first shielding walls further comprise a plurality of abutting members, and the abutting members respectively extend toward the receiving space from the two first shielding walls to abut against the circuit board.

11. The antenna assembly according to claim 8, wherein the shielding housing further comprises a fixation base, the fixation base is connected to the connection portion, and the fixation base is adapted to be assembled with a chassis of the desktop computer.

12. The antenna assembly according to claim 4, wherein the shielding housing comprises a top wall, the two first shielding walls, and the two second shielding walls; the two first shielding walls and the two second shielding walls are connected to the top wall, respectively; the two first shielding walls are in parallel with each other, the two second shielding walls are in parallel with each other and connected to the two first shielding walls, respectively; a receiving space is between the top wall, the two first shielding walls, and the two second shielding walls; the circuit board is provided with two first engaging portions, the two second shielding walls are provided with two second engaging portions, the two first engaging portions extend into the receiving space, the two second engaging portions extend toward the receiving space from the two second shielding walls, and each of the first engaging portions is engaged with a corresponding one of the second engaging portions.

13. The antenna assembly according to claim 12, wherein one of the two second shielding walls has an engaging groove, the engaging groove is in communication with the receiving space, the circuit board is provided with an engaging block, a bottom portion of one of the two first engaging portions is on the engaging block, and one side of the engaging block is correspondingly engaged with the engaging groove.

14. The antenna assembly according to claim 12, wherein the two first shielding walls further comprise a plurality of abutting members, the abutting members respectively extend toward the receiving space from the two first shielding walls to abut against the circuit board.

15. The antenna assembly according to claim 12, wherein the shielding housing further comprises a fixation base, the fixation base is connected to one of the two first shielding walls and extends away from the receiving space, and the fixation base is adapted to be assembled with a chassis of the desktop computer.

16. The antenna assembly according to claim 1, wherein the antenna body comprises a peripheral portion, a radiation portion, a signal feed-in portion, and a welding portion; the peripheral portion is on a periphery of a surface of the circuit board and contacts one of the two first shielding walls or one of the two second shielding walls; the peripheral portion surrounds the radiation portion, the signal feed-in portion is on the radiation portion and configured to be connected to a signal feed-in wire, and the welding portion is on the periphery portion and configured to be welded with the signal feed-in wire.

17. The antenna assembly according to claim 16, wherein the antenna body comprises a bridging portion connected between the peripheral portion and the radiation portion.

18. The antenna assembly according to claim 16, wherein the peripheral portion has a notch.

19. The antenna assembly according to claim 1, wherein the antenna body comprises a side edge portion, a radiation portion, a signal feed-in portion, and a welding portion; the side edge portion is at one side of the first wall and connected to one of the two first shielding walls or one of the two second shielding walls; the radiation portion is at one side of the side edge portion, the signal feed-in portion is on the radiation portion and configured to be connected to a signal feed-in wire, and the welding portion is on the side edge portion and configured to be welded with the signal feed-in wire.

20. An antenna assembly adapted to be assembled on a desktop computer, wherein the antenna assembly comprises:

an insulated body comprising a first wall, two first side walls, two second side walls, a connection portion, and a fixation base, wherein a solid portion is between the first wall, the two first side walls, the two second side walls, and the connection portion; the first wall faces an outside of the desktop computer, the two first side walls and the two second side walls extend from a periphery of the first wall, and the two first side walls are in parallel with each other; one of two ends of each of the two second side walls away from the first wall is connected to the connection portion, the fixation base extends from one side of the connection portion and is adapted to be assembled with a chassis of the desktop computer, a portion of the first wall has a recessed portion and a portion of one of the two second shielding walls has an engaging groove, and a shape of one end of the recessed portion substantially corresponds to a shape of the engaging groove;

a shielding layer coated on the two first side surfaces, the two second side surfaces, the connection portion, and a surface of the fixation base; and an antenna body at a first surface of the first wall, wherein at least one portion of the antenna body is connected to the shielding layer, and the antenna body operates within a frequency range of 2400 MHz to 2500 MHz or 5150 MHz or 7125 MHz.

* * * * *